US008169918B2

(12) United States Patent
Duan et al.

(10) Patent No.: US 8,169,918 B2
(45) Date of Patent: May 1, 2012

(54) RECEIVED INFORMATION MONITOR ADAPTIVE TO MULTIPLE MONITORING MODES IN A COMMUNICATION DEVICE

(75) Inventors: Cheng Gang Duan, Shanghai (CN); Lin Hua, Shanghai (CN); Ze Mian Huang, Shanghai (CN); Michael S. Shaffer, Lynnfield, MA (US); Qian Gao Xu, Shanghai (CN)

(73) Assignee: LSI Corporation, Milpitas, CA (US)

( * ) Notice: Subject to any disclaimer, the term of this patent is extended or adjusted under 35 U.S.C. 154(b) by 401 days.

(21) Appl. No.: 12/494,459

(22) Filed: Jun. 30, 2009

(65) Prior Publication Data

US 2010/0329122 A1  Dec. 30, 2010

(51) Int. Cl.
*H04J 1/16* (2006.01)

(52) U.S. Cl. .......................................... 370/241; 370/412

(58) Field of Classification Search .......... 370/241–252, 370/389–394, 412–428, 465–467
See application file for complete search history.

(56) References Cited

U.S. PATENT DOCUMENTS

| 2001/0043603 | A1* | 11/2001 | Yu ................................. 370/393 |
| 2002/0069390 | A1* | 6/2002 | Yamawaki ..................... 714/798 |
| 2003/0128712 | A1* | 7/2003 | Moriwaki et al. ............. 370/412 |
| 2009/0046741 | A1* | 2/2009 | Duan et al. .................... 370/469 |

OTHER PUBLICATIONS

U.S. Appl. No. 11/839,971, filed in the name of C.G. Duan et al. on Aug. 16, 2007 and entitled "Synchronous Transport Signal Mapper with Payload Extraction and Insertion Functionality."
U.S. Appl. No. 11/935,533, filed in the name of C.G. Duan et al. on Nov. 6, 2007 and entitled "In-Band Communication of Alarm Status Information in a Synchronous Transport Communication System."
Agere Systems, "TMXF84622 Ultramapper 622/155 Mbits/s SONET SDX x DS3/E3/DS2/DS1/E1/DS0," Ultramapper Resource Document, Jun. 6, 2002, pp. 1-250.

* cited by examiner

*Primary Examiner* — Ricky Ngo
*Assistant Examiner* — Kan Yuen
(74) *Attorney, Agent, or Firm* — Ryan, Mason & Lewis, LLP (57) ABSTRACT

An apparatus for monitoring of received information in a communication device comprises a first buffer having a plurality of storage elements adapted to store respective portions of the received information, a second buffer coupled to the first buffer and having a plurality of storage elements corresponding to respective ones of the storage elements of the first buffer, and controller circuitry coupled to the buffers and operative to detect a message sequence comprising a plurality of the portions of the received information. The second buffer stores a previously-detected message sequence loaded from the first buffer into the second buffer under control of the controller circuitry. The controller circuitry in detecting a current message sequence is configurable in at least first and second different monitoring modes each associated with a different message format. The monitoring mode of the controller circuitry may be adaptively configured based at least in part on a detected message sequence.

23 Claims, 3 Drawing Sheets

RECEIVED INFORMATION MONITOR ADAPTIVE TO MULTIPLE MONITORING MODES IN A COMMUNICATION DEVICE

FIELD OF THE INVENTION

The present invention relates generally to network-based communication systems, and more particularly to communication devices which process received information in such communication systems.

BACKGROUND OF THE INVENTION

Conventional network-based communication systems include systems configured to operate in accordance with well-known synchronous transport standards, such as the synchronous optical network (SONET) and synchronous digital hierarchy (SDH) standards.

The SONET standard was developed by the Exchange Carriers Standards Association (ECSA) for the American National Standards Institute (ANSI), and is described in the document ANSI T1.105-1988, entitled "American National Standard for Telecommunications—Digital Hierarchy Optical Interface Rates and Formats Specification" (September 1988), which is incorporated by reference herein. SDH is a corresponding standard developed by the International Telecommunication Union (ITU), set forth in ITU standards documents G.707 and G.708, which are incorporated by reference herein.

The basic unit of transmission in the SONET standard is referred to as a synchronous transport signal level-1 (STS-1). It has a serial transmission rate of 51.84 Megabits per second (Mbps).

Synchronous transport signals at higher levels may be concatenated or channelized. For example, an intermediate unit of transmission in the SONET standard is referred to as synchronous transport signal level-3, concatenated (STS-3c). It has a serial transmission rate of 155.52 Mbps. The corresponding unit in the SDH standard is referred to as STM-1. In a concatenated synchronous transport signal, the entire payload is available as a single channel. A channelized signal, by way of contrast, is divided into multiple channels each having a fixed rate. For example, the channelized counterpart to the concatenated STS-3c signal is denoted STS-3. STS-3 is a channelized signal that comprises three separate STS-1 signals each at 51.84 Mbps.

A given STS-3c or STM-1 signal is organized in frames having a duration of 125 microseconds, each of which may be viewed as comprising nine rows by 270 columns of bytes, for a total frame capacity of 2,430 bytes per frame. The first nine bytes of each row comprise transport overhead (TOH), while the remaining 261 bytes of each row are referred to as a synchronous payload envelope (SPE). Synchronous transport via SONET or SDH generally involves a hierarchical arrangement in which an end-to-end path may comprise multiple lines with each line comprising multiple sections.

The TOH includes section overhead (SOH), pointer information, and line overhead (LOH). The SPE includes path overhead (POH) comprising a single column of bytes. The SOH includes a section trace byte J0 that is used to support continuity testing between transmitting and receiving devices of a given section within a particular line and path. The J0 byte may be used to transmit a one-byte string, a 16-byte string or a 64-byte string. The POH includes a path trace byte J1 that is used to support continuity testing between transmitting and receiving devices of a given path. Like the J0 byte, the J1 byte may also be used to transmit a one-byte string, a 16-byte string or a 64-byte string. Pointer bytes H1 and H2 in the TOH may be used to indicate the position of the POH column in the SPE. The strings transmitted using the J0 or J1 bytes are also referred to herein as "message sequences" or simply "messages."

Additional details regarding SONET/SDH signal and frame formats can be found in the above-cited documents.

In conventional SONET or SDH network-based communication systems, synchronous transport signals like STS-3c or STM-1 are mapped to or from corresponding higher-rate optical signals such as a SONET OC-12 signal or an SDH STM-4 signal. An OC-12 optical signal carries four STS-3c signals, and thus has a rate of 622.08 Mbps. The SDH counterpart to the OC-12 signal is the STM-4 signal, which carries four STM-1 signals, and thus also has a rate of 622.08 Mbps. The mapping of these and other synchronous transport signals to or from higher-rate optical signals generally occurs in a physical layer device commonly referred to as a mapper, which may be used to implement an add-drop multiplexer (ADM) or other node of a SONET or SDH communication system.

Such a mapper typically interacts with a link layer processor. A link layer processor is one example of what is more generally referred to herein as a link layer device, where the term "link layer" generally denotes a switching function layer. Another example of a link layer device is a field programmable gate array (FPGA). These and other link layer devices can be used to implement processing associated with various packet-based protocols, such as Internet Protocol (IP) and Asynchronous Transfer Mode (ATM), as well as other protocols, such as Fiber Distributed Data Interface (FDDI). A given mapper or link layer device is often implemented in the form of an integrated circuit.

The particular formats used for messages carried by the J0 and J1 bytes of a SONET/SDH synchronous transport signal can vary depending upon the operating mode of the transmitting device. For example, in a SONET framing mode of operation with a frame synchronization flag, the transmitting device will automatically pad a given user-entered string to 62 bytes using ASCII NULL characters and then add <CR> and <LF> characters, given by 0D and 0A, respectively, in hexadecimal notation, for a total of 64 bytes. In the corresponding SDH framing mode with a frame synchronization flag, the most significant bit (MSB) of the first byte of a J0 or J1 message is set to a logic "1" value.

There are also SONET and SDH framing modes that do not utilize a frame synchronization flag. In such modes, there is no particular head or tail for the message sequence, and it can be captured in any phase since it appears circularly. This message format is required in the Multiplex Section Shared Protection Ring (MS-SPRING) arrangement described in ITU-T standards document G.841, which is incorporated by reference herein.

As another example, if there is no particular user-entered string to be transmitted using the J1 byte, the 64-byte string that is transmitted is set to all zeros using 64 consecutive ASCII NULL characters.

These and other variations in J0/J1 message formats can create problems for the receiving device. For example, the receiving device may have to negotiate with the transmitting device to set the appropriate operating mode in advance. This makes it difficult to alter existing connections "on the fly," and to build new connections. Also, it is difficult to configure a given device to support multiple message formats such as those described above without significantly increasing the hardware costs associated with the device.

Accordingly, a need exists for an improved approach to monitoring of received information that can accommodate multiple message formats at low cost and without the need for advance negotiation between transmitting and receiving devices.

SUMMARY OF THE INVENTION

Illustrative embodiments of the present invention overcome the above-noted drawbacks of conventional practice by configuring a given receiving device to support monitoring of multiple message formats, and to automatically adapt to a particular one of the message formats utilized by a corresponding transmitting device.

Although particularly useful for monitoring of J0 or J1 bytes in synchronous transport signals, these and other illustrative embodiments of the present invention can also be utilized with a wide variety of other types of signals, including signals comprising packet data, or asynchronous signals. More generally, the techniques disclosed herein can be applied to any type of signal structure in which the interpretation of received information can vary depending upon the particular message format utilized by the transmitting device.

In accordance with one aspect, an apparatus implemented in a mapper or other communication device comprises a first buffer having a plurality of storage elements adapted to store respective portions of the received information, a second buffer coupled to the first buffer and having a plurality of storage elements corresponding to respective ones of the storage elements of the first buffer, and controller circuitry coupled to the buffers and operative to detect a message sequence comprising a plurality of the portions of the received information. The second buffer stores a previously-detected message sequence loaded from the first buffer into the second buffer under control of the controller circuitry. The controller circuitry in detecting a current message sequence is configurable in at least first and second different monitoring modes each associated with a different message format. The monitoring mode of the controller circuitry may be adaptively configured based at least in part on a detected message sequence.

In one of the illustrative embodiments, the controller circuitry is configurable in a first framing mode in which each message sequence has a first length and includes a frame synchronization flag of a first type, a second framing mode in which each message sequence has a second length different than the first length and includes a frame synchronization flag of a second type, and one or more additional modes in which each message sequence does not include a frame synchronization flag. For example, the additional modes may include a sustained change mode in which a given message sequence is accepted as a new message sequence only if a designated number of such message sequences are consecutively received, and a capture mode in which a given message sequence is accepted as a new message sequence upon receipt of only a single such message sequence.

The illustrative embodiments of the invention provide a number of significant advantages over the conventional techniques previously described. For example, by configuring a mapper or other communication device of a network-based communication system to perform J0 or J1 monitoring in the disclosed manner, a large number of monitoring modes can be supported at low cost while avoiding the need for advance negotiation, thereby increasing device flexibility and improving throughput performance of the system.

DETAILED DESCRIPTION OF THE INVENTION

The invention will be illustrated herein in conjunction with an exemplary network-based communication system which includes a physical layer device, a link layer device and other elements configured in a particular manner. It should be understood, however, that the invention is more generally applicable to any communication system application in which it is desirable to provide enhanced efficiency and flexibility in monitoring of received information where the interpretation of the information can vary depending upon the operating mode and corresponding message format utilized by the transmitting device.

Figure 1:
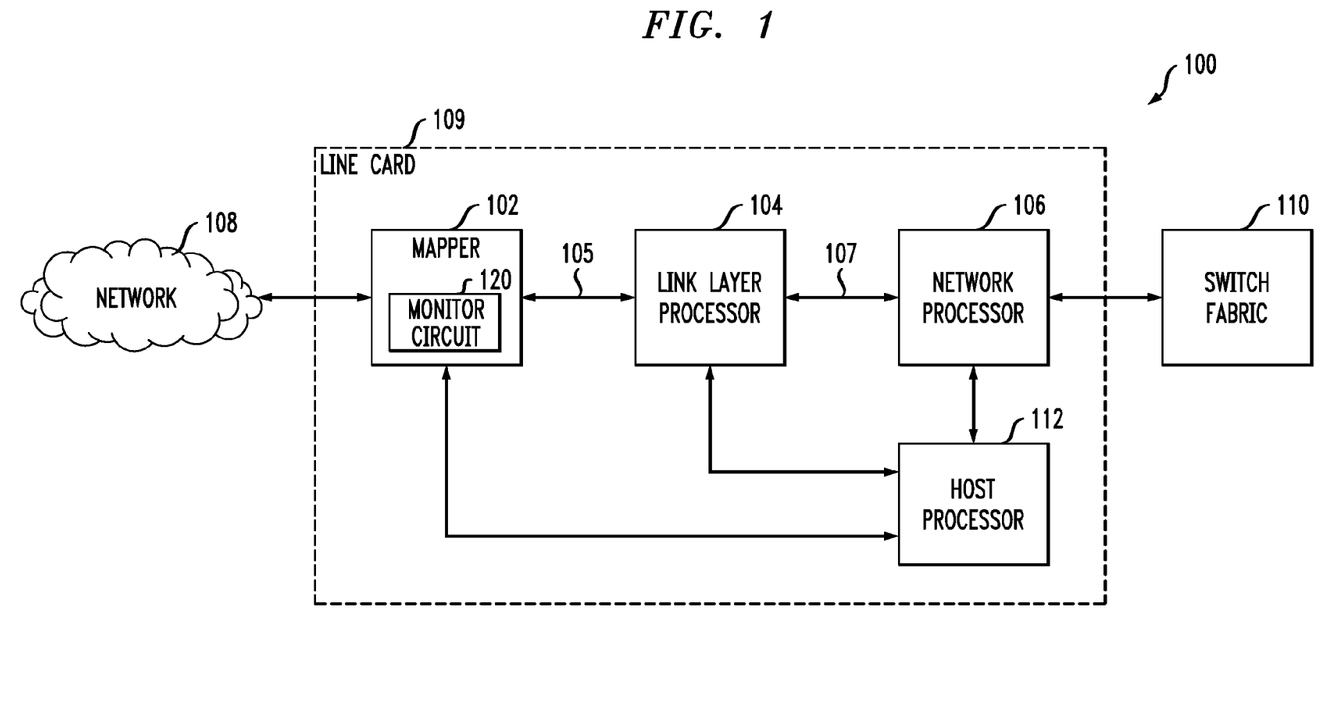
FIG. 1 is a block diagram of a network-based communication system comprising a mapper having at least one monitor circuit in an illustrative embodiment.

FIG. 1 shows a network-based communication system 100 in an illustrative embodiment of the invention. The system 100 includes a mapper 102 coupled to a link layer processor 104 via an interface 105. The mapper 102 is a physical layer device suitable for providing access termination and aggregation for multiple services. One or more additional physical layer devices may be utilized in conjunction with the mapper 102, but such devices are not explicitly shown in the figure for clarity and simplicity of illustration. The link layer processor 104 is also coupled to a network processor 106, via an interface 107. The mapper 102 in this embodiment is coupled to a network 108. Examples of other types of physical layer devices that may be incorporated into the system 100 include an optical transceiver for interfacing the mapper with an optical transmission medium of the network 108.

The link layer processor 104 is an example of what is more generally referred to herein as a "link layer device." Such a device is intended to be broadly construed to encompass any type of processor which performs processing operations associated with a link layer of a network-based system. The term "physical layer device" as used herein is intended to encompass a device which provides an interface between a link layer device and a physical transmission medium of a network-based system.

The mapper 102 performs signal mapping functions on SONET/SDH signals of a type generally known in the art. For example, network 108 may comprise routers, switches or other network elements of a SONET/SDH network operating as described in the above-cited SONET/SDH standards documents. It should be noted that the term "SONET/SDH" as used herein refers to SONET and/or SDH. The mapper 102 may provide an interface between such SONET/SDH network elements and other system elements, such as plesiochronous digital hierarchy (PDH) elements that process DS1/E1 and/or DS3/E3 signals.

The mapper 102 and link layer processor 104 may include additional functionality of a conventional type. Such additional functionality, being well known to those skilled in the art, will not be described in detail herein, but may include functionality associated with known mappers, such as the LSI Hypermapper™, Ultramapper™ and Supermapper™ devices, and known link layer devices, such as the LSI Link Layer Processor. These LSI devices are commercially available from LSI Corporation of Milpitas, Calif., U.S.A. The network processor 106 may comprise, for example, a conventional network processor such as an LSI Advanced PayloadPlus® network processor in the APP300, APP500 or APP650 product family, also commercially available from LSI Corporation.

Additional details regarding conventional aspects of a SONET/SDH mapper can be found in, for example, TMXF84622 Ultramapper™ 622/155 Mbits/s SONET/SDH x DS3/E3/DS2/DS1/E1/DS0, Ultramapper™ Resource Document, Jun. 6, 2002, which is incorporated by reference herein.

Although only a single mapper 102 is shown in the FIG. 1 embodiment, other embodiments may comprise multiple mappers. For example, a group of multiple mappers may be arranged in a master-slave configuration that includes at least one master mapper and a plurality of slave mappers. Other embodiments may include only a single slave mapper, rather than multiple slave mappers. Numerous alternative configurations of multiple mappers are also possible, as will be appreciated by those skilled in the art.

The mapper 102, link layer processor 104, and network processor 106 in this illustrative embodiment are installed on a line card 109 of the system 100. The line card 109 is coupled between network 108 and a switch fabric 110 of the system 100 as shown. The link layer processor 104 and network processor 106 are configured to communicate packets, cells or other protocol data units (PDUs) between the network 108 and the switch fabric 110 which controls switching of PDU data. As indicated previously, the mapper 102 serves to interface the link layer processor 104 to physical transmission media of the network 108, which may comprise optical fiber links or any other type of transmission media.

Also installed on the line card 109 is a host processor 112. This processor is used to configure and control one or more of the other processing elements of the line card, such as the mapper 102, link layer processor 104 and network processor 106. As a more particular example, a given such host processor utilized to configure and control both the mapper 102 and the link layer processor 104 is referred to herein as a microprocessor unit (MPU). Portions of the host processor functionality may be incorporated into one or more of elements 102, 104 or 106 in alternative embodiments of the invention.

In the present embodiment, the mapper 102 comprises at least one monitor circuit 120 that supports different interpretations of J0 and J1 bytes within a given SONET/SDH synchronous transport signal depending on the operating mode and corresponding message format utilized by the transmitting device from which the J0 and J1 bytes are received. Alternative embodiments may comprise multiple monitor circuits 120, with each such monitor circuit having substantially the same functionality. The operation of a given monitor circuit 120 will be described in greater detail below with reference to FIGS. 2, 3 and 4.

Various elements of the system 100 may be implemented, by way of example and without limitation, utilizing a microprocessor, central processing unit (CPU), digital signal processor (DSP), ASIC, FPGA, or other type of data processing device, as well as portions or combinations of these and other devices. Each of the devices 102, 104, 106 and 112 may therefore be implemented as a separate integrated circuit or alternatively multiple such devices may be combined into a single integrated circuit.

It should be noted that the line card configuration shown in FIG. 1 is merely one example of a possible system configuration. Other embodiments can be implemented using a wide variety of other types of structural arrangements that do not involve line cards. The elements 102, 104, 106, 109, 110 and 112 in this example may be viewed as being part of a particular node of network 108 that operates in accordance with the SONET/SDH standards. Other nodes of the network 108 may of course be configured in a similar manner.

The interface 105 between the mapper 102 and the link layer processor 104 may comprise a conventional interface over which signals are transmitted from a mapper to a link layer processor, and over which signals are received by a mapper from a link layer processor.

The mapper 102 may be equipped with payload extraction and insertion functionality, such that SONET/SDH payloads can be communicated between the mapper and the link layer device. See U.S. patent application Ser. No. 11/839,971, filed Aug. 16, 2007 and entitled "Synchronous Transport Signal Mapper with Payload Extraction and Insertion Functionality," which is commonly assigned herewith and incorporated by reference herein.

The mapper 102 may also or alternatively be configured to support 1+1 protection switching. For example, the mapper may comprise a working device and a protection device, with in-band communication of alarm status information or other types of information between the protection device and the working device. Such arrangements are described in U.S. patent application Ser. No. 11/935,533, filed Nov. 6, 2007 and entitled "In-Band Communication of Alarm Status Information in a Synchronous Transport Communication System," which is commonly assigned herewith and incorporated by reference herein.

The interface 107 between the link layer processor 104 and the network processor 106 may be, for example, a conventional interface such as a SPI-3 interface as described in Implementation Agreement OIF-SPI3-01.0, "System Packet Interface Level 3 (SPI-3): OC-48 System Interface for Physical and Link Layer Devices," Optical Internetworking Forum, 2001, which is incorporated by reference herein. Other types of known interfaces, such as POS-2, may also be used.

Although the link layer processor 104 and network processor 106 are shown as separate elements in this illustrative embodiment, other embodiments may combine the functionality of the link layer processor and the network processor into a single link layer device. The general term "link layer device" as used herein is thus intended to encompass devices which incorporate at least a portion of the functionality commonly associated with a network processor.

For example, a given link layer device may be configured to provide flow control, traffic shaping and other functions. It may include an internal memory, as well as an interface to an external memory. Such memory elements may be utilized for implementing PDU buffer memory, queuing and dispatch buffer memory, etc. The link layer device may further include one or more memory controllers, as well as appropriate interface circuitry for interfacing with the mapper 102 or other physical layer device(s), the switch fabric 110, and other external devices, such as the host processor 112, which may be configured to communicate with the link layer device over a standard bus architecture, e.g., a peripheral component interconnect (PCI) bus. The link layer device may also include a scheduler, queuing and dispatch logic, as well as other conventional elements not explicitly shown in the figure. The operation of these and other conventional elements, being well understood by those skilled in the art, is not described in detail herein.

Numerous alternative interfacing arrangements are possible. It is also possible that, in other embodiments, a given link layer device may be combined with one or more physical layer devices into a single device. Thus the mapper 102 and any associated physical layer device(s) need not be physically separate from the link layer processor 104 as in the FIG. 1 embodiment, but such elements could instead be combined into a single integrated circuit or other type of processing device.

It may be assumed with reference to the system 100 of FIG. 1 that an "ingress" direction refers to a direction of data transfer from the network 108 to the switch fabric 110. Similarly, it may be assumed that an "egress" direction refers to a direction of data transfer from the switch fabric 110 to the network 108. It should be understood that these and other assumptions made herein are for clarity and simplicity of description only, and should not be construed as limitations of the invention. The terms "ingress" and "egress" thus do not refer to particular fixed directions, but instead may be viewed as arbitrary input and output data flow directions in a particular system implementation.

It should also be noted that the particular arrangement of system elements shown in FIG. 1 is by way of illustrative example only. More particularly, a mapper with at least one monitor circuit supporting multiple monitoring modes as disclosed herein can be implemented in any type of communication system in which the interpretation of monitored information varies depending upon the message format utilized by a transmitting device. The system 100 may include other elements in addition to or in place of those specifically shown, including one or more elements of a type commonly found in a conventional implementation of such a system.

As indicated previously herein, it is difficult to configure a receiving device to support multiple transmitting device operating modes that involve different interpretations of the same information, such as messages transmitted using J0 and J1 bytes of the respective SOH and POH of a synchronous transport signal.

Figure 2:
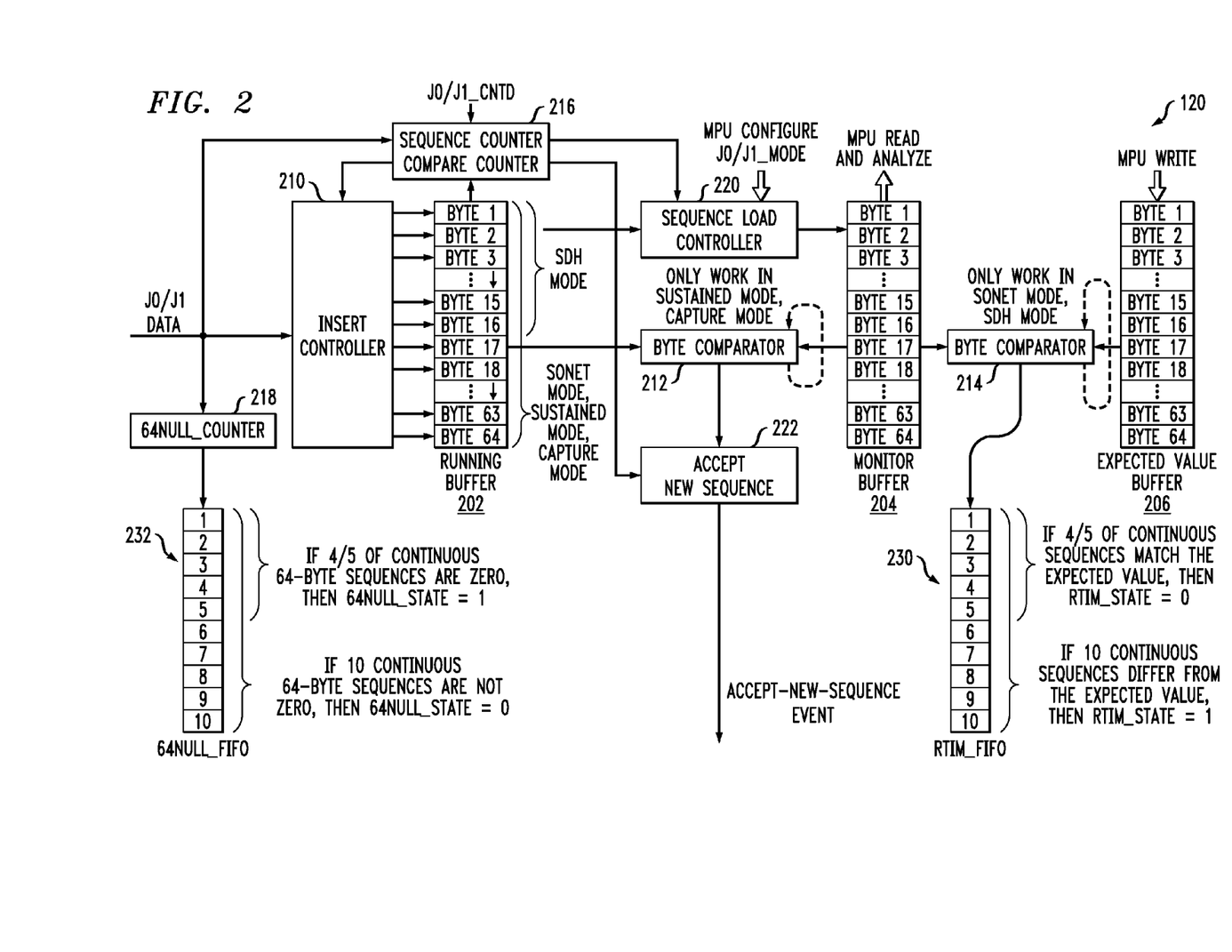
FIG. 2 is a more detailed view of an exemplary monitor circuit implemented in the mapper of the FIG. 1 system.

In the present embodiment, the monitor circuit 120 is configured to process received J0/J1 data to detect the corresponding message format and to adapt its monitoring mode automatically to coincide with the detected message format. The monitor circuit can support J0/J1 message formats that include a frame synchronization flag and formats that do not include such a flag, as well as formats that require detection of 64-byte NULL sequences. The monitor circuit generates status and event alarms when a new J0/J1 message sequence is accepted or the content of an accepted sequence is different from its expected value.

It should be noted that "J0/J1" as that term is used herein is intended to refer to J0 and/or J1. Thus, received J0/J1 data may comprise J0 data, J1 data or both J0 and J1 data.

The monitor circuit 120 can be configured into four different monitoring modes including an SDH framing mode, a SONET framing mode, a sustained change mode and a capture mode. In each of these monitoring modes, the monitor circuit further supports 64-Null detection. The SDH and SONET framing modes support J0/J1 message sequences with a frame synchronization flag, while the sustained change mode and the capture mode support J0/J1 message sequences without a frame synchronization flag. TABLE 1 below provides additional details regarding the four monitoring modes of the monitor circuit in the present embodiment.

TABLE 1

J0/J1 Monitoring Modes

| J0/J1 Monitoring Mode | Description | Alarms | Control/Updated Registers |
|---|---|---|---|
| SDH Framing Mode | The MSB of the first byte of a 16-byte J0/J1 message sequence should be "1". | RTIM_State = 1, indicating a mismatch, when the received message differs from the expected message for 10 consecutive messages. RTIM_State = 0, indicating no mismatch, when 4 out of 5 received messages match the expected message. | Monitor Buffer [1:16] [7:0] Expected Value Buffer [1:16] [7:0] |
| SONET Framing Mode | The last two bytes of a 64-byte J0/J1 message sequence should be "0D" and "0A". | | Monitor Buffer [1:64] [7:0] Expected Value Buffer [1:64] [7:0] |
| Sustained Change Mode | A sustained change is detected when a received 64-byte J0/J1 message differs from the last stable message for J0/J1_CNTD consecutive messages. The new message then becomes the stable message and the process starts checking for a sustained change from this new stable message. | Accept New Sequence Event | J0/J1_CNTD [3:0] Monitor Buffer [1:64] [7:0] |

TABLE 1-continued

J0/J1 Monitoring Modes

| | |
|---|---|
| Capture Mode | A sustained change is detected when a received 64-byte J0/J1 message differs from the last stable message for one message. The new message then becomes the stable message and the process starts checking for a sustained change from this new stable message. |
| The function of 64-Null detection is supported in every monitor mode above. | |
| Null Monitoring (Active in all Modes) | 64Null_State = 0 when 10 consecutive received 64-byte messages differ from the null pattern (0x00). 64Null_State = 1 when 4 out of 5 received 64-byte messages match the null pattern. |

FIG. 2 shows a more detailed view of the monitor circuit 120 of the mapper 102 in one embodiment. The monitor circuit comprises a running buffer 202, a monitor buffer 204, and an expected value buffer 206, with each of these buffers being configured to store 64 bytes of information denoted Byte1 through Byte64. The monitor circuit further comprises an insert controller 210, comparators 212 and 214, counter elements 216 and 218, sequence load controller 220, accept new sequence element 222 and shifters 230 and 232.

The running buffer 202 stores bytes of the incoming J0/J1 data as received and inserted by the insert controller 210 into appropriate ones of the buffer registers.

The monitor buffer 204 stores an accepted J0/J1 message sequence in a particular message format that can be read out and analyzed by the MPU.

The expected value buffer 206 stores standard J0/J1 message sequence values, which can be configured by the MPU.

The byte comparator 212 compares corresponding stored bytes circularly between the running buffer 202 and the monitor buffer 204. Thus, the Byte1 value stored in the running buffer is compared with the Byte1 value stored in the monitor buffer, followed by comparison of the Byte2 values, and so on for the other values of the stored bytes. Similarly, the byte comparator 214 compares corresponding stored values circularly between the monitor buffer 204 and the expected value buffer 206.

The counter element 216 includes two counters, a sequence counter and a compare counter. The sequence counter indicates how many repeated sequences have been received. The compare counter indicates which byte in the running buffer 202 should be compared with a given newly received J0/J1 byte. These counters are responsive to a J0/J1_CNTD signal configurable by the MPU. As will be described in greater detail below, the J0/J1_CNTD signal is utilized in the sustained change and capture modes to specify a particular number of consecutive J0/J1 sequences to be counted. The J0/J1_CNTD signal in the illustrative embodiment comprises a 4-bit signal denoted J0/J1_CNTD [0:3].

The sequence load controller 220 is responsive to the sequence counter of element 216 and a J0/J1_Mode signal configured by the MPU.

Although not shown in the figure, registers may be used to store the current configured values of the J0/J1_CNTD and J0/J1_Mode signals.

The output of the byte comparator 214 is applied to shifter 230 which is implemented as a 10-element first-in first-out (FIFO) shift register RTIM_FIFO, where RTIM denotes Receiving Trace Identifier Mismatch. Associated logic elements, not explicitly shown in the figure, control the value of an RTIM_State signal such that RTIM_State=1 when the received message differs from the expected message for 10 consecutive messages, and RTIM_State=0 when 4 out of 5 received messages match the expected message.

The 64Null_Counter 218 operates in conjunction with shifter 232 which is implemented as a 10-element FIFO shift register 64Null_FIFO. Associated logic elements, not explicitly shown in the figure, control the value of a 64Null_State signal such that 64Null_State=1 when 4 out of 5 received 64-byte messages match the null pattern, and 64Null_State=0 when 10 consecutive received 64-byte messages differ from the null pattern (0x00).

The 64Null_Counter 218 is an example of what is more generally referred to herein as a "pattern detection counter." In other embodiments, this element can be adapted for use in detecting other types of fixed patterns.

Figure 3:
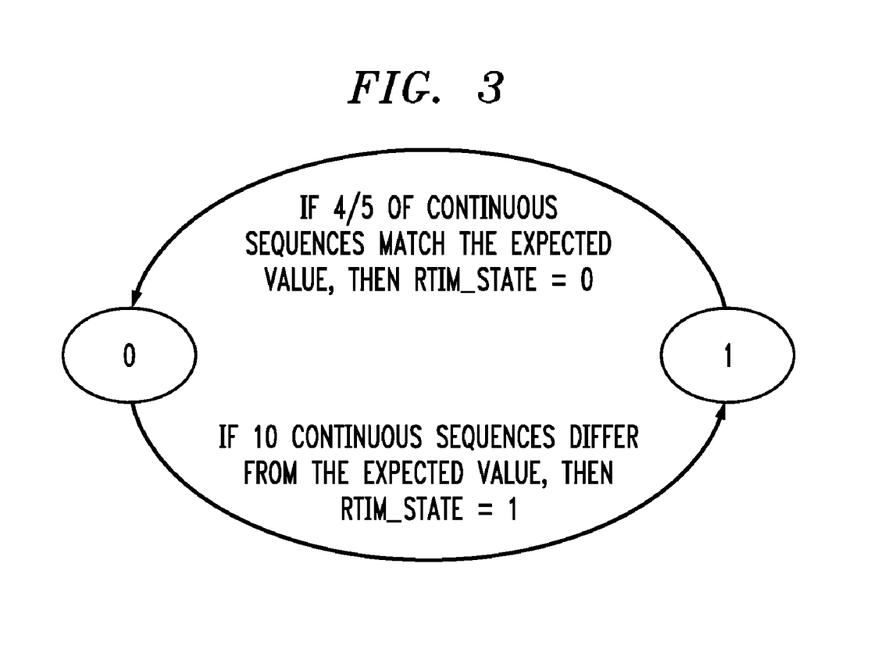
FIGS. 3 and 4 are state diagrams illustrating the operation of respective portions of the exemplary monitor circuit of FIG. 2.
Figure 4:
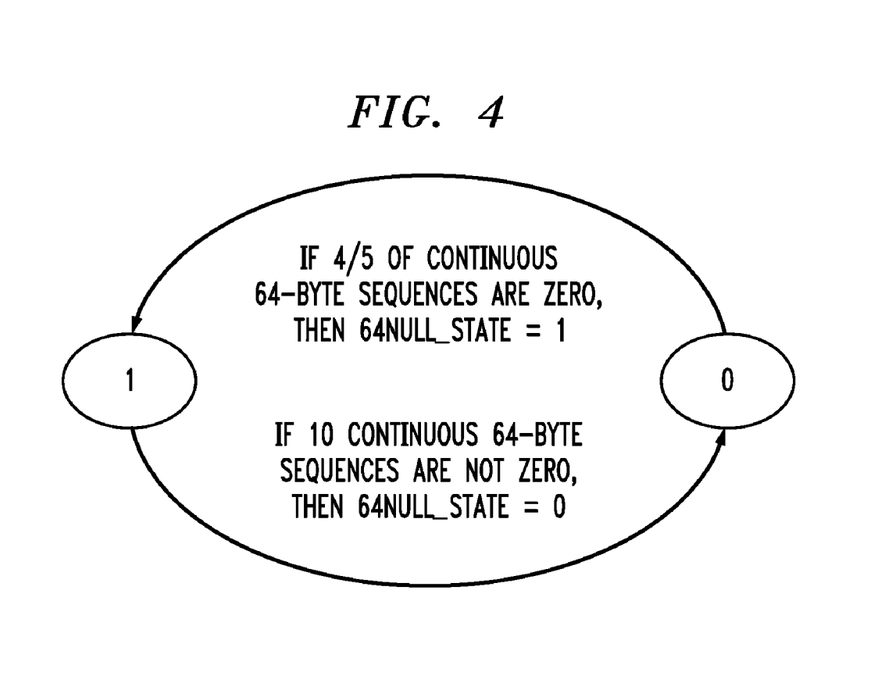

Finite state machines that may be used to generate the RTIM_State and 64Null_State signals are shown in FIGS. 3 and 4, respectively. As indicated above, such finite state machines may be implemented using appropriate logic elements associated with the shifters 230 and 232. Numerous suitable configurations of these and other logic elements using hardware, software or firmware would be readily apparent to one skilled in the art and are therefore not described in further detail herein.

The operation of the monitor circuit 120 of FIG. 2 will now be described in greater detail with reference to its various monitoring modes as shown in TABLE 1.

SDH Framing Mode

In this mode, the J0/J1 message sequence length is 16 bytes, and so only the first 16 bytes of each of the three 64-byte buffers 202, 204 and 206 are utilized. Each received J0/J1 byte is initially inserted into Byte1 of the running buffer, and then shifted through the buffer as additional bytes are received, eventually reaching Byte16. The MSB of Byte16, which serves as the frame synchronization flag in the SDH framing mode, is continually checked to see whether it is "1". If the MSB of Byte16 is "1", an integrated 16-byte sequence has been received. The entire 16-byte sequence will then be loaded into the monitor buffer 204, from which the MPU can read the value of an accepted 16-byte sequence.

An accept-new-sequence event is generated by element 222 when a new 16-byte sequence is accepted. It should be noted that a new 16-byte sequence is not accepted unless successive bytes containing detected MSB flags are spaced 16 bytes apart. This ensures that a bit error will not cause the logic to falsely lock onto an incorrect pattern.

The byte comparator 214 then compares the bytes of the accepted 16-byte sequence stored in the monitor buffer 204 with the corresponding bytes of an expected 16-byte sequence stored in the expected value buffer 206. This comparison is performed circularly from Byte1 to Byte16. A single bit of mismatch information is generated for each sequence and accumulated over multiple sequences in the RTIM_FIFO shifter 230. The finite state machine of FIG. 3, previously described above, processes the accumulated mismatch information in order to control the value of the RTIM_State signal. This signal can be supplied to a network administrator or otherwise processed to address the conditions that led to the mismatch.

SONET Framing Mode

The operation of the monitor circuit 120 in the SONET framing mode is very similar to its operation in the SDH framing mode, except that the message sequence length is now 64 bytes and frame synchronization flag comprises the last two bytes ("0D" and "0A") of the message instead of the MSB of the first byte. Thus, all 64 bytes of each of the buffers 202, 204 and 206 are utilized in the SONET framing mode. Each received J0/J1 byte is initially inserted into Byte1 of the running buffer 202, and then shifted through the buffer as additional bytes are received, eventually reaching Byte64. The values in Byte2 and Byte1 are continually checked to see whether they are "0D" and "0A" respectively. If they are "0D" and "0A" respectively, an integrated 64-byte sequence has been received. The entire 64-byte sequence will then be loaded into the monitor buffer 204, from which the MPU can read the value of an accepted 64-byte sequence.

An accept-new-sequence event is generated by element 222 when a new 64-byte sequence is accepted. It should be noted that a new 64-byte sequence is not accepted unless successive bytes containing the detected flag characters are spaced 64 bytes apart. This ensures that a bit error will not cause the logic to falsely lock onto an incorrect pattern.

The byte comparator 214 then compares the bytes of the 64-byte sequence stored in the monitor buffer 204 with the corresponding bytes of a 64-byte sequence stored in the expected value buffer 206. This comparison is performed circularly from Byte1 to Byte64. A single bit of mismatch information is generated for each sequence and accumulated over multiple sequences in the RTIM_FIFO shifter 230. The finite state machine of FIG. 3, previously described above, processes the accumulated mismatch information in order to control the value of the RTIM_State signal. This signal can be supplied to a network administrator or otherwise processed to address the conditions that led to the mismatch.

Sustained Change Mode

In this mode, there is no frame synchronization flag, and so the monitor circuit 120 can segment received J0/J1 bytes into 64-byte sequences using any appropriate phase. The byte comparator 212 and compare counter of element 216 are utilized in this mode to implement a compare-and-replace process for the running buffer 202, in contrast to the data-shifting process used in the above-described SDH and SONET framing modes.

The running buffer 202 stores the previous received J0/J1 sequence, and the monitor buffer 204 stores the previous accepted J0/J1 sequence as loaded from the running buffer 202. A newly received J0/J1 byte is compared with the current value of Bytei in the running buffer, where i is determined by the compare counter. This comparison may occur in the insert controller 210. If the newly received J0/J1 byte does not match the current value of Bytei of the running buffer, then the newly received J0/J1 byte is stored in Bytei, replacing its previous value. The compare counter is then incremented by one and the sequence counter is reset to zero. This means that any previous accumulated 64-byte sequences with the previous Bytei value are canceled and the monitor circuit 102 should start to count from scratch. Compared with the data-shifting process that is utilized in the SDH and SONET framing modes, this compare-and-replace process avoids the buffer set-up time required to shift in an entire 64-byte sequence if there are only one or more bytes that differ from the corresponding values in the running buffer.

If the newly received J0/J1 byte matches the current value of Bytei, then the compare counter is incremented by one. When the compare counter reaches 64, indicating that another 64-byte sequence having the same values as the previous 64-byte sequence has been received, the compare counter resets to one and the sequence counter is incremented by one. When the sequence counter reaches the J0/J1_CNTD value configured by the MPU, indicating that the same 64-byte sequence has been received consecutively J0/J1_CNTD times, and there exists at least one byte mismatch between the running buffer 202 and the monitor buffer 204 as determined by byte comparator 212, an accept-new-sequence event is generated by element 222. This event may be communicated to the MPU or a network administrator.

Capture Mode

The capture mode is a special case of the above-described sustained change mode with the value of J0/J1_CNTD configured to one.

Null Detection

As indicated previously, the function of 64-Null detection is supported in each one of the four monitoring modes described above. When 64 consecutive newly received J0/J1 bytes have zero values, the 64Null_Counter 218 will insert a zero into the 64NULL_FIFO shifter 232. FIG. 4 shows the state machine for generating the 64Null_State signal based on processing of the contents of the shifter 232.

It is to be appreciated that the particular monitoring modes described above are presented by way of illustrative example only, and that alternative embodiments may include only a subset of these modes, or an entirely different set of monitoring modes.

For example, the portions of the monitor circuit 120 utilized in the FIG. 2 embodiment to implement null detection can be modified in a straightforward manner to implement detection of a wide variety of other types of fixed patterns.

The monitor circuit 102 may be advantageously configured to adapt automatically to the J0/J1 operating mode of a corresponding transmitting device from which it receives the J0/J1 data.

For example, the monitor circuit may be initially set to operate in the capture mode, such that a 64-byte J0/J1 sequence is received every 64 SONET/SDH frames. When an accept-new-sequence event is triggered, the MPU can read the new sequence from the monitor buffer 204 and analyze it for the presence of frame synchronization flags. If such flags are detected, the monitor circuit may be automatically placed in the appropriate SDH or SONET framing mode.

Thus, the monitor circuit can be used in conjunction with software running on the MPU to detect the J0/J1 operating mode of the transmitting device and to adapt its monitoring mode automatically to the corresponding message format. A receiving device that includes the monitor circuit 120 can therefore adapt to changes in the operating mode of the transmitting device without any need for advance negotiation between the devices. This facilitates the changing of existing connections "on the fly," as well as the building of new connections.

Moreover, these and other advantages of the illustrative embodiments are achieved with low hardware cost and high efficiency. For example, the use of single byte-width comparators running circularly achieves significant hardware cost savings relative to a 64-byte comparator. Also, the compare-and-replace process used in the sustained change or capture modes allows the running buffer to update very quickly to a new J0/J1 sequence. Finally, use of the FIFO shifters to implement finite state machines for mismatch and null detection ensures that the MPU obtains accurate and stable information.

In the embodiments described above, it is assumed without limitation that the monitored information comprises received J0/J1 data of a synchronous transport signal. However, the disclosed techniques can be adapted in a straightforward manner to providing monitoring functionality for other types of information, including overhead information associated with signals comprising packet data, such as asynchronous transfer mode (ATM) signals and pseudo-wire emulation (PWE) signals, as well as PDH signals. More generally, the techniques disclosed herein can be applied to any type of signal structure in which the interpretation of received information can vary depending upon the operating mode of the transmitting device.

It should be noted that various elements of monitor circuit 120, such as the controllers 210 and 220, the counter elements 216 and 218, and the comparators 212 and 214, may be implemented at least in part in the form of one or more software programs running on the above-noted MPU or another type of general-purpose processor. For example, a memory associated with the mapper 102 or host processor 112 may be used to store executable program code of this type. Such a memory is an example of what is more generally referred to herein as a "computer program product" having executable computer program code embodied therein. The computer program code when executed in a mapper or other communication device causes the device to perform operations for monitoring of J0/J1 bytes or other received information. Other examples of computer program products embodying aspects of the invention may include, for example, optical or magnetic disks.

Also, a mapper or other communication device in accordance with the invention may be implemented as an integrated circuit device suitable for installation on a line card or port card of a router or switch. Numerous other configurations are possible.

In a given integrated circuit implementation, identical die are typically formed in a repeated pattern on a surface of a semiconductor wafer. Each die includes a mapper, link layer processor or other device as described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Again, it should be emphasized that the embodiments of the invention as described herein are intended to be illustrative only. For example, the particular arrangement of physical layer device, link layer device, network processor and other elements as shown in FIG. 1 may be varied in alternative embodiments. Also, the particular signals shown in the drawings and described above are presented by way of example, and those skilled in the art will recognize that alternative signal configurations and associated processing arrangements may be used. Furthermore, other types of circuitry may be used to implement monitoring operations as disclosed herein. These and numerous other alternative embodiments within the scope of the following claims will be readily apparent to those skilled in the art.

What is claimed is:

1. An apparatus comprising:
   a first buffer having a plurality of storage elements adapted to store respective portions of received information;
   a second buffer coupled to the first buffer and having a plurality of storage elements corresponding to respective ones of the storage elements of the first buffer; and
   controller circuitry coupled to the buffers and operative to detect a message sequence comprising a plurality of said portions of the received information;
   wherein the second buffer stores a previously-detected message sequence loaded from the first buffer into the second buffer under control of the controller circuitry;
   wherein the controller circuitry in detecting a current message sequence is configurable in at least first and second different monitoring modes each associated with a different message format; and
   wherein the controller circuitry comprises a first comparator operative to compare a current message sequence stored in the first buffer with the previously-detected message sequence stored in the second buffer and to generate a new sequence indicator if the current message sequence does not match the previously-detected message sequence.

2. The apparatus of claim 1 wherein the received information comprises J0 or J1 data of a synchronous transport signal and each said portion comprises a byte of the J0 or J1 data.

3. The apparatus of claim 1 wherein the first comparator comprises a single byte width comparator that operates circularly to implement a byte-by-byte comparison of the current message sequence stored in the first buffer with the previously-detected message sequence stored in the second buffer.

4. The apparatus of claim 1 further comprising a third buffer coupled to the second buffer and the controller circuitry and having a plurality of storage elements corresponding to respective ones of the storage elements of the first and second buffers.

5. The apparatus of claim 1 wherein the controller circuitry further comprises a pattern detection counter operative to generate an output indicative of whether or not a given message sequence includes a designated pattern.

6. The apparatus of claim 1 wherein the controller circuitry in detecting the current message sequence is operative to adapt its monitoring mode automatically to coincide with a detected message format.

7. An apparatus comprising:
   a first buffer having a plurality of storage elements adapted to store respective portions of received information;
   a second buffer coupled to the first buffer and having a plurality of storage elements corresponding to respective ones of the storage elements of the first buffer;
   controller circuitry coupled to the buffers and operative to detect a message sequence comprising a plurality of said portions of the received information; and
   a third buffer coupled to the second buffer and the controller circuitry and having a plurality of storage elements corresponding to respective ones of the storage elements of the first and second buffers;
   wherein the second buffer stores a previously-detected message sequence loaded from the first buffer into the second buffer under control of the controller circuitry;

wherein the controller circuitry in detecting a current message sequence is configurable in at least first and second different monitoring modes each associated with a different message format; and wherein the third buffer stores an expected message sequence loaded under control of an associated processor.

8. The apparatus of claim 7 wherein the controller circuitry comprises a second comparator operative to compare a previously-detected message sequence stored in the second buffer with the expected message sequence stored in the third buffer and to generate an output indicative of whether or not the previously-detected message sequence matches the expected message sequence.

9. The apparatus of claim 8 wherein the second comparator comprises a single byte width comparator that operates circularly to implement a byte-by-byte comparison of the previously-detected message sequence stored in the second buffer with the expected message sequence stored in the third buffer.

10. The apparatus of claim 8 wherein the controller circuitry further comprises a mismatch signal generator operative to accumulate outputs of the second comparator over a plurality of message sequences and to generate a mismatch signal by processing the accumulated outputs of the second comparator.

11. The apparatus of claim 10 wherein the mismatch signal generator comprises a FIFO shifter and associated control logic implementing a mismatch detection finite state machine.

12. An apparatus comprising:
a first buffer having a plurality of storage elements adapted to store respective portions of received information;
a second buffer coupled to the first buffer and having a plurality of storage elements corresponding to respective ones of the storage elements of the first buffer and
controller circuitry coupled to the buffers and operative to detect a message sequence comprising a plurality of said portions of the received information;
wherein the second buffer stores a previously-detected message sequence loaded from the first buffer into the second buffer under control of the controller circuitry;
wherein the controller circuitry in detecting a current message sequence is configurable in at least first and second different monitoring modes each associated with a different message format;
wherein the controller circuitry further comprises a pattern detection counter operative to generate an output indicative of whether or not a given message sequence includes a designated pattern; and
wherein the controller circuitry further comprises a pattern detection signal generator operative to accumulate outputs of the pattern detection counter over a plurality of message sequences and to generate a pattern detection signal by processing the accumulated outputs of the pattern detection counter.

13. The apparatus of claim 12 wherein the pattern detection signal generator comprises a FIFO shifter and associated control logic implementing a pattern detection finite state machine.

14. apparatus comprising:
a first buffer having a plurality of storage elements adapted to store respective portions of received information;
a second buffer coupled to the first buffer and having a plurality of storage elements corresponding to respective ones of the storage elements of the first buffer; and
controller circuitry coupled to the buffers and operative to detect a message sequence comprising a plurality of said portions of the received information;
wherein the second buffer stores a previously-detected message sequence loaded from the first buffer into the second buffer under control of the controller circuitry;
wherein the controller circuitry in detecting a current message sequence is configurable in at least first and second different monitoring modes each associated with a different message format; and
wherein the controller circuitry is configured in the first monitoring mode to shift portions of the current message sequence into the first buffer as received and in the second monitoring mode to utilize a byte-by-byte compare-and-replace process to store particular portions of the current message sequence into corresponding storage elements of the first buffer.

15. An apparatus comprising:
a first buffer having a plurality of storage elements adapted to store respective portions of received information;
a second buffer coupled to the first buffer and having a plurality of storage elements corresponding to respective ones of the storage elements of the first buffer; and
controller circuitry coupled to the buffers and operative to detect a message sequence comprising a plurality of said portions of the received information;
wherein the second buffer stores a previously-detected message sequence loaded from the first buffer into the second buffer under control of the controller circuitry;
wherein the controller circuitry in detecting a current message sequence is configurable in at least first and second different monitoring modes each associated with a different message format; and
wherein the controller circuitry is configurable in two or more of the following monitoring modes each associated with a different message format:
a first framing mode in which each message sequence has a first length and includes a frame synchronization flag of a first type;
a second framing mode in which each message sequence has a second length different than the first length and includes a frame synchronization flag of a second type; and
at least one additional mode in which each message sequence does not include a frame synchronization flag.

16. The apparatus of claim 15 wherein the at least one additional mode comprises at least one of a sustained change mode in which a given message sequence is accepted as a new message sequence only if a designated number of such message sequences are consecutively received and a capture mode in which a given message sequence is accepted as a new message sequence upon receipt of only a single such message sequence.

17. The apparatus of claim 15 wherein the controller circuitry is adaptable to switch from one of the monitoring modes to another one of the monitoring modes based on a pattern detected in at least one received message sequence.

18. An integrated circuit comprising the apparatus of claim 1.

19. A communication device comprising the apparatus of claim 1.

20. A node of a network-based communication system, said node comprising:
a physical layer device; and
a link layer device coupled to the physical layer device;

wherein the physical layer device comprises:
a first buffer having a plurality of storage elements adapted to store respective portions of received information;
a second buffer coupled to the first buffer and having a plurality of storage elements corresponding to respective ones of the storage elements of the first buffer; and
controller circuitry coupled to the buffers and operative to detect a message sequence comprising a plurality of said portions of the received information;
wherein the second buffer stores a previously-detected message sequence loaded from the first buffer into the second buffer under control of the controller circuitry;
wherein the controller circuitry in detecting a current message sequence is configurable in at least first and second different monitoring modes each associated with a different message format; and
wherein the controller circuitry comprises a first comparator operative to compare a current message sequence stored in the first buffer with the previously-detected message sequence stored in the second buffer and to generate a new sequence indicator if the current message sequence does not match the previously-detected message sequence.

21. A network-based communication system comprising:
a plurality of interconnected nodes;
wherein at least a given one of said nodes comprises:
a first buffer having a plurality of storage elements adapted to store respective portions of received information;
a second buffer coupled to the first buffer and having a plurality of storage elements corresponding to respective ones of the storage elements of the first buffer; and
controller circuitry coupled to the buffers and operative to detect a message sequence comprising a plurality of said portions of the received information;
wherein the second buffer stores a previously-detected message sequence loaded from the first buffer into the second buffer under control of the controller circuitry;
wherein the controller circuitry in detecting a current message sequence is configurable in at least first and second different monitoring modes each associated with a different message format; and
wherein the controller circuitry comprises a first comparator operative to compare a current message sequence stored in the first buffer with the previously-detected message sequence stored in the second buffer and to generate a new sequence indicator if the current message sequence does not match the previously-detected message sequence.

22. A method for use in a monitor circuit comprising at least first and second buffers and controller circuitry coupled to the buffers, the method comprising the steps of:
storing portions of received information in respective storage elements of the first buffer;
detecting a current message sequence in said stored portions;
loading said detected message sequence from said storage elements of the first buffer into corresponding storage elements of the second buffer; and
configuring a monitoring mode of the controller circuitry based at least in part on the detected message sequence;
wherein said detecting step comprises the steps of:
comparing a current message sequence stored in the first buffer with a previously-detected message sequence stored in the second buffer; and
generating a new sequence indicator if the current message sequence does not match the previously-detected message sequence.

23. A computer program product comprising a non-transitory computer readable medium having executable computer program code embodied therein, wherein the computer program code when executed in a communication device causes the device to perform the steps of the method of claim 22.

* * * * *